March 17, 1953 — J. J. COPPEN — 2,631,905
BEARING SURFACE
Filed July 25, 1947 — 2 SHEETS—SHEET 1
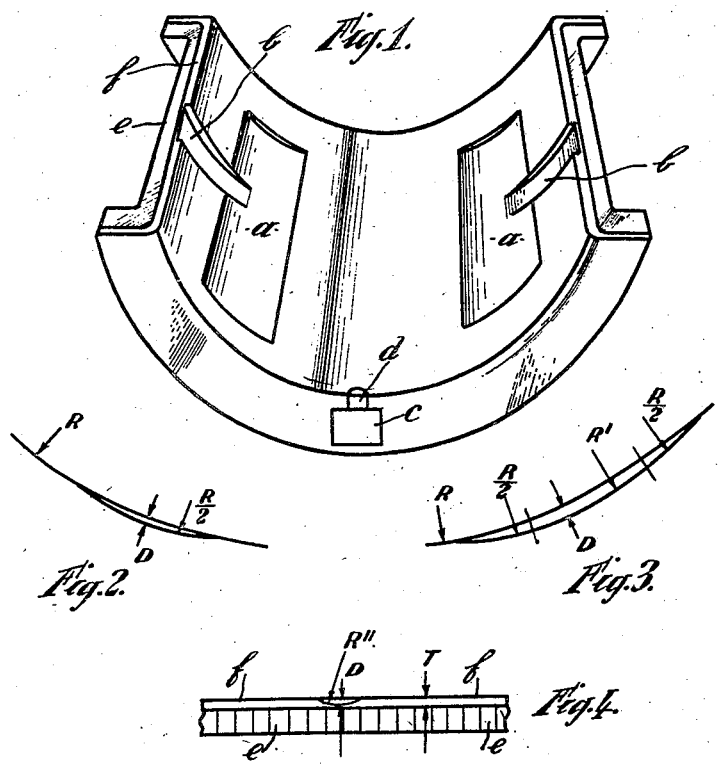
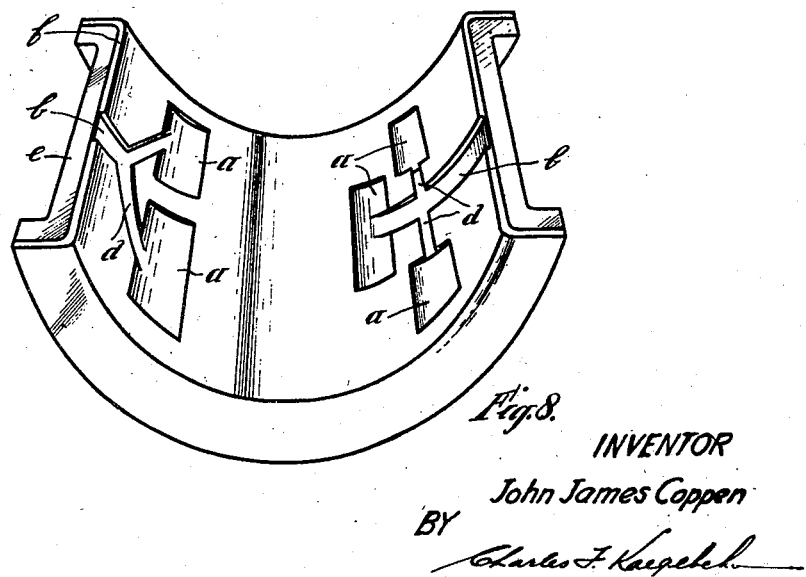
INVENTOR
John James Coppen
BY
Charles F. Kaegebeh March 17, 1953    J. J. COPPEN    2,631,905
BEARING SURFACE
Filed July 25, 1947    2 SHEETS—SHEET 2
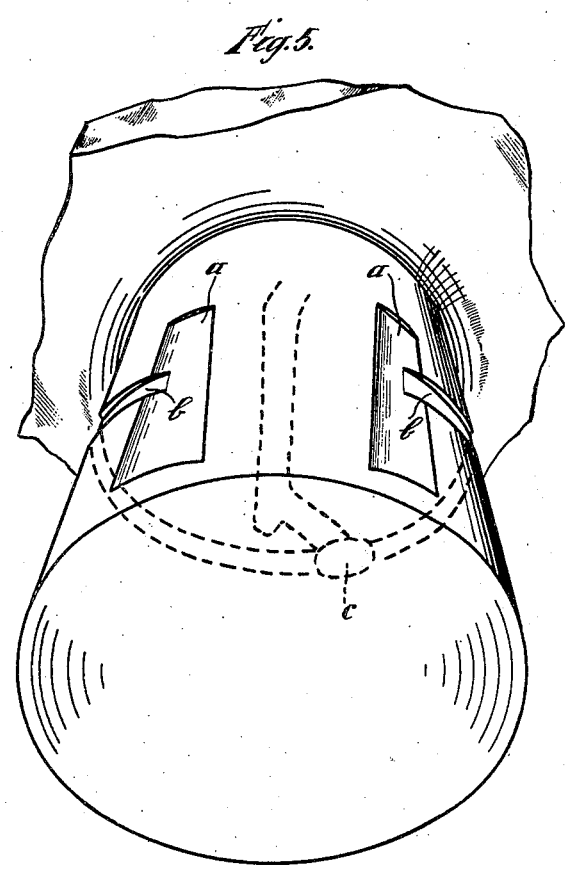
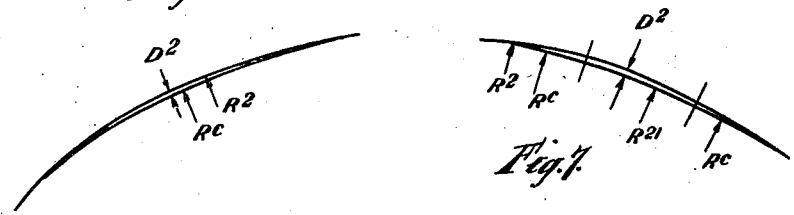
INVENTOR
John James Coppen
BY
Charles F. Kaegebeh Patented Mar. 17, 1953

2,631,905

UNITED STATES PATENT OFFICE 2,631,905

BEARING SURFACE

John James Coppen, London, England, assignor to National Lead Company, New York, N. Y.

Application July 25, 1947, Serial No. 763,687
In Great Britain August 6, 1946

4 Claims. (Cl. 308—240)

This invention relates to plain bearings, and is applicable to every type of plain bearing used in engineering practice, wherein a shaft is journalled within an outer shell, the object of the invention being to increase the efficiency of such bearings by fostering the best possible distribution and utilisation of the lubricating medium used.

The behaviour of the oil film is greatly influenced by the correctness of the design of the plain bearings and their housings and by the physical and mechanical properties of the metals and alloys which compose the rubbing surfaces. The standard of workmanship must also be of a high quality as small irregularities on the rubbing surfaces react unfavourably on the oil film. It is essential for good service that this invention is applied to plain bearings which have been properly designed and carefully constructed from correct materials and that a suitable lubricant is used.

The most efficient service is obtained from plain bearings operating under any conditions when an oil film is maintained continuously between the metallic rubbing surfaces. This is particularly important when an engine or machine is starting from rest. The oil film should be formed with the least possible delay when only a fraction of a revolution has been made by one part upon the other as a considerable amount of wear may take place before the oil film is established. When the parts are at rest the oil film is usually broken and the shaft rests within the outer component with metallic contact between the two surfaces.

The running clearance in a plain bearing is normally of small dimensions. By way of example a shaft two inches in diameter runs with a clearance on the diameter of approximately two thousandths of an inch while the oil film thickness in the loaded area is less than half the running clearance. Under running conditions, the shaft is located eccentrically in the outer shell or component to an extent approximately equal to the running clearance less the thickness of the oil film. The thinnest part of the oil film is to be found in the area of maximum loading in the bearing and in the case of a horizontal shaft loaded vertically and revolving clockwise, the area or maximum loading is defined by drawing a radius from the centre of the shaft to the outer shell which is approximately 30° past the bottom dead centre. This line will usually pass through the centre of or lie adjacent said centre of the maximum loaded area. The dimensions of the plant and the speed at which the shaft is revolving has some influence on the position of the area of maximum load. The pressure in the oil film is at a minimum and practically uniform over the periphery of the shaft between the termination of the area of maximum load through the top dead centre round to a point which is horizontal with the centre of the shaft. This is assuming that the load on the shaft is applied vertically. The pressure in the oil film increases approximately uniformly from the minimum point to the maximum point in approximately 120° of arc and thereafter falls sharply to the minimum which obtains for the remainder of the circumference of the shaft.

Under these conditions where the shaft is eccentrically located by the extent of the running clearance and the pressure on the periphery of the shaft is varying it will be seen that the volume of the oil is at a minimum in the maximum loaded area. Thereafter the volume has again to expand and there is considerable possibility that the oil film will be interrupted through there not being sufficient oil between the rubbing surfaces to fill the increased space requirements as oil is practically incompressible. The surplus has been squeezed out from the ends of the shell or outer component when the space available is at a minimum.

It has been generally realised that the oil should be distributed uniformly over the rubbing surfaces, and normal practice applied to achieving this consists of providing oil grooves. These are more particularly used when a revolving shaft is carried in a fixed shell. Many forms of oil grooves have been used and these vary widely in their cross-section, spacing and path in the bearing.

According to the present invention, recesses or pockets are formed in the stationary or moving part of a bearing surface where relative movement takes place between such a surface and a shaft, or the lining on the shaft for the purpose of collecting lubricant and distributing it uniformly over the surfaces where wear takes place.

The recess generally according to the invention consists of a shallow, crescent-shaped pocket extending longitudinally over a portion of the length of the inner face of the outer component. The recess is sealed by leaving lateral boundary portions to the recess which will be true circles, the boundary portions also prevent oil supplied to the bearing through passages from leaking out from the recess and along the shaft. Where the outer component is lined, it is preferred that the recesses do not pierce the lining.

The oil pocket maintains the oil film and provides an accurately controlled rate of contraction and expansion of the volume of the oil. The pockets are formed in two ways depending upon whether they are in the outer shell or component or whether they are on the surface of the shaft. When they are formed in the shell or outer component, a cutting appliance, such as a milling cutter or grinding wheel is rotated in the bore of the shell or component with its axis parallel to the central axis of the shell. The diameter of the cutter or grinding wheel may be of any size less than the bore, but it has been found that the diameter producing the best type of pocket is approximately equal to the radius of the bore. The ends of the cutter teeth or the grinding wheel are made with a small radius to avoid sharp corners in the pockets. When the cutter is traversed radially to a known setting and then moved longitudinally through the bore, a pocket will be generated. The pocket generally extends approximately two thirds the width of the shell or component leaving approximately one sixth of the cylindrical portion of the bore at either end of the pocket undisturbed as a lateral boundary. This fraction of one sixth is the best in normal practice, although it may be varied considerably.

Where pockets are to be generated on a shaft, the shaft is mounted eccentrically in a machine tool and rotated. Any degree of eccentricity may be employed, but in practice it is found that the best shape of pocket is produced when the excentres are offset to an extent equal to the radius of the shaft. The excentres are, therefore, approximately on the circumference and the axis joining them is parallel to the longitudinal central axis of the shaft or crank pin. The pockets are then generated by suitable cutting or abrasion. The radial location of the pockets in the desired positions is obtained by the selection of suitable centre points. The width of the pocket is approximately two thirds the width of the revolving outer component so that the circular portions extend at either end of the pocket for a distance of approximately one sixth of the cylindrical portion of the revolving component and form lateral boundaries to the pockets. This fraction of one sixth is best, although in normal practice it may be varied considerably.

In general, the pockets are parallel to the centre line of the bore of the shell or to the centre line of the shaft. Certain considerations may cause the pocket to be set at an angle, but in practice it is preferable to avoid this as such an arrangement creates difficulties in manufacture and causes disturbance to the uniform distribution of the lubricant.

In addition to the above method which generates a pocket with its base being an arc of a circle, the shell or shaft may also be rotated and oscillated through a small angle during manufacture. This will result in the pocket having a portion of its base parallel to the surface of the shaft or shell, but of a different radius to that of the surface of the shaft or bearing shell.

The location of the pocket or pockets within the bore of the fixed outer shell or on the circumference of the fixed shaft is determined by two main conditions. The first of these is the pressure of the oil being supplied to the open space between the rubbing surfaces. The increase in pressure of oil from the area of minimum loading to the area of maximum loading can be assessed from the design of the plant or engine. A suitable point is selected so that the pressure of the oil supply is substantially greater than the pressure in the oil between the rubbing surface. Clearly if a point is selected where the pressure is too great between the rubbing surfaces, the supply of oil from the feed pipe is restricted and may be in the reverse direction to that desired.

The other main consideration in locating the pocket or pockets is to provide an oil supply to meet the demand for oil created by the expansion of the space between the rubbing surfaces after the maximum loaded area. The pockets encourage the retention of the oil in the bearing when at rest by capillary attraction acting between the surfaces which are separated only by a small distance and which are approximately parallel.

In general, the oil pockets described are in the shaft where this is fixed, and in the outer shell where this is fixed. Cases may arise, however, where it is more convenient to have the pocket or pockets on the revolving outer component or on the revolving shaft. This has the disadvantage, however, that the oil pockets traverse at each revolution the area on maximum loading. In general, this condition may limit the load which the bearing will carry, but other factors may overcome any objections to this or even make it advisable. For example, it may be convenient for the pockets to pass in succession over an orifice in the shaft discharging oil.

The foregoing descriptions relate to the main application of my invention which is to plain bearings, wherein a shaft is journalled in a shell. The location of one of the thrust pockets in each flange of a thrust bearing is such that it is in that part of the periphery which coincides with the area on maximum loading in the bearing. The oil pressure is at a maximum at this point and the flow of oil is, therefore, encouraged into the pocket on the thrust face as the oil leaks out from either end of the bearing. This type of bearing is mainly adapted to carry loads in the plane of a diameter of the shaft.

Modifications are required when the bearing is also required to resist thrusts which act approximately parallel to the longitudinal axis of the shaft. The general shape of the pockets will be as already described, but as they have to be incorporated in a comparatively narrow thrust face they will clearly be much shorter. The main general guide holds regarding the length of the pockets viz: that one sixth of the width should be left clear at each side of the pocket to form the lateral boundaries. A gate is provided in the end of the pockets nearest the bore to allow the oil to flow into the pocket. Alternatively, the pocket extends to the bore of the shell. The method of generating the pockets is also similar to that already described for shells with the exception that a tapered milling cutter or grinding wheel consisting of a truncated cone may be used which rotates on its axis which is parallel to the radius of the thrust flange of the bearing shell.

My invention may be applied to every type of plain bearing used in engineering practice, the main use being in the cylindrical portion of such bearings, and other uses being where the shaft or bore is tapered to any degree including radial thrust faces.

Anti-friction metal may be secured to the shaft where this is fixed or to the bore of the gear wheel or similar component which revolves upon it. Where the shaft revolves it is usual to locate the anti-friction metal in the fixed shell, but in certain cases the anti-friction metal may also be attached to the shaft. The load on the shaft or outer shell is carried on the cylindrical portion of either, and in addition provision is made for limiting end movement or resisting end thrust. An arrangement of thrust flanges matching suitable thrust shoulders is used to put this into effect.

A supply of oil can be arranged through a hollow shaft where this is fixed or revolving. Where the outer shell is fixed it is also convenient to arrange for a supply of oil to this from the outside as in the case of a main bearing in an internal combustion engine. The case where the oil is fed from the outside to a revolving component presents technical difficulties and will rarely arise in practice, but my invention can be applied to it.

In order that the invention may be clearly understood and readily carried into effect, reference is directed to the accompanying drawings, wherein:

Fig. 1 is a perspective view of the loaded half of a bearing shell incorporating oil pockets in accordance with the invention and the means whereby oil is supplied.

Figs. 2, 3 and 4 illustrate in cross-section the pockets, such as incorporated in the bearing shell illustrated in Fig. 1.

Fig. 5 is a perspective view illustrating a fixed shaft formed with pockets in accordance with the invention and loaded in relation to the loaded area.

Figs. 6 and 7 illustrate in detail cross-sections of the pocket.

Fig. 8 is a perspective view illustrating an alternative arrangement of oil pockets formed in the loaded part of a bearing shell in which a shaft revolves.

Referring to the drawings, in Fig. 1 oil pockets $a$ are formed in the bore of the loaded half of a bearing shell and supplied with oil from grooves $b$. The grooves $b$ communicate with a corresponding circumferential groove in the unloaded and related half of the bearing shell. The groove in turn, communicates with the oil supply system of the engine or similar plant. This arrangement is particularly applicable to bearing shells in accordance with the invention when they are fitted to an engine where the oil supply system is already determined. Where, however, it is possible to bring the supply of oil directly through the shell to the pockets it is clear that the grooves $b$ can be omitted. In some cases there may be no direct supply of oil to the pockets $a$ which are then fed from oil in the clearance space.

The oil pocket $c$ on the thrust face of the bearing shell has a small gate $d$ which connects the pocket $c$ to the bore of the shell. The oil leaking from the end of the shell is under pressure due to issuing from the area of maximum loading. The oil, therefore, is encouraged to flow through the gate $d$ into the pocket $c$.

The detail of the pockets in the bore is shown in cross-section in Figs. 2, 3 and 4 where R is the radius of the bore of the shell $R/2$ is the radius of the milling cutter or grinding wheel used to generate the pocket and D is the depth of the pocket which is approximately ten times the running clearance. In general, D is less than the thickness of the antifriction metal applied, and if it is greater a suitable recess is made in the bronze or steel structure or base $e$ of the shell prior to applying the lining $f$ to incorporate the increased depth so that the layer of antifriction metal is continuous and not broken by the pocket. An alternative arrangement of the pocket in the bore consists of two sides being generated by a milling cutter of radius $R/2$, and these are connected by a portion of the pocket of radius R' which is centred on the same point as radius R and equal to R plus D (see Figure 3).

The details of the pockets on the thrust faces is shown in Fig. 4 where R" is the radius of the milling cutter used to generate the pocket. D is the depth of the pocket which is less than the antifriction layer $f$ of thickness T. Where D is greater than T, the steel or bronze support $e$ is machined to allow for a greater thickness of antifriction metal being applied at this point so that the pocket does not break through the layer of antifriction metal.

In Fig. 5 which shows an arrangement in which a shaft is fixed the pockets $a$ therein are supplied either through grooves $b$ which communicate with an opening $c$ into the hollow shaft, or an alternative arrangement is where the opening $c$ communicates directly with the pocket $a$.

The details of the pockets on the surface of the shaft are shown in cross-section in Figs. 6 and 7 where R2 is the radius of the shaft and RC is the radius of the periphery when the part is mounted eccentrically in a machine tool during manufacture. D2 is the depth of the pocket which is approximately ten times the running clearance. In general, D is less than the thickness of the antifriction metal when applied to the shaft and if it is greater a suitable radius is made in the surface of the metal of which the shaft is composed prior to applying the lining. This greater thickness will incorporate the increased depth of the pocket so that the layer of antifriction metal is continuous and not broken by the pocket. An alternative arrangement of the pocket consists of the two sides being generated by mounting the shaft in turn on two eccentric settings and these are connected by a portion of the pocket of radius R2' which is centred on the same point as radius R2 and equal to R2 and D2.

In Fig. 8 a loaded half of a shell is shown embodying two methods of arranging the pockets $a$. In one case a group of three pockets $a$ is supplied with oil from the groove $b$ by way of small subsidiary gates $d$. In the other case, two pockets $a$ are supplied with oil from the groove $b$ through the subsidiary gates $d$. The oil groove $b$ communicates with a circumferential groove in the unloaded half which in turn is connected to the oil supply of the engine or similar plant. The oil grooves $b$ may in some applications be omitted entirely.

The general dimensions of the pockets are such that the depth is extremely shallow while they are relatively wide. An approximation is that the depth of the pockets will be of the order of ten times the running clearance between the shaft and the outer shell or component. This makes it possible for the pockets to be incorporated in the lining of antifriction metal without breaking through this into the steel or bronze which supports the antifriction metal. The radii of the cutters employed, the radii of the surface containing the pockets and the depth of the pockets all determine the finished sizes of the pockets.

Where the antifriction metal is fairly thin, so that even such shallow pockets would break through the lining, it is necessary to provide a similar recess in the steel or bronze support which is afterwards lined and then the pocket is generated in the thicker portion of the lining so obtained.

When the invention is applied to an actual bearing use is made of certain assumptions of a theoretical nature. A number of formulae exist governing the behaviour of plain bearings, but in practice, however, there are very wide divergencies from the anticipated results. The factors which it is considered account for these divergencies are that small vortices are set up in the lubricant which rotate with their axes on or parallel to the radii of the shaft, and also that the conditions existing in a loaded bearing approximate to, and therefore may be subjected to, the known hydraulic phenomena appertaining to the flow of an incompressible fluid in a confined space with corrections for the influence of one wall being moving.

The vortices are very small as they have to exist in a fluid which is only a few thousandths of an inch in depth. As a very rough approximation, the depth of the fluid is one thousandth of the diameter of the shaft if the lining in the bearing is a tin base alloy and about one seven hundredth if the lining is a hard alloy, such as copper-lead or aluminum base. The diameter of the vortices can only be a few times their depth. By way of example, a typical vortex in a bearing on a shaft of 4 inches diameter would be expected to have a depth of a maximum of four to six thousandths of an inch assuming the shaft is fully eccentric in its journal by being in metallic contact at one point. The diameter of a typical vortex might be several times the depth. There is, therefore, room for a great number of such vortices to exist in a bearing at one time. They will tend to travel at a speed less than the peripheral speed of the shaft, but their angular velocity may result in a greater speed being attained within the vortex itself.

It is considered that favourable conditions exist for setting up vortices when the shaft is revolving very slowly, i. e. starting from rest, or when it is revolving at a high speed. At slow speeds the volume of lubricant is in process of being established and is not continuous. At high speeds circumferential irregularities, such as tool marks on the shaft and in the bearing which vary from the uniform surface finishes tend to create vortices.

The general effect of a typical vortex is to limit the effective thickness of the volume of lubricant. Considerable energy is required to shear the vortex and the lubricating effect has, therefore, to be confined to the upper and lower limit in its depth. The conditions outlined above, all tend to create heat which arises from the absorption of energy when the shaft is forced to revolve.

The hydraulic behaviour of the lubricant in a bearing is comparatively unknown. It is assumed that turbulence exists in the space occupied by the lubricant which is of the nature of a "tube" of peculiar cross-section in that its width is perhaps a thousand times its depth. It is assumed that the two wide walls are fixed and the very narrow end walls are ignored, the critical velocity of a fluid flowing in such a "tube" would be very low, even when allowance for the viscosity is made. The fact of one wide wall being moving, such as in the case in a plain bearing, will tend to raise the critical velocity. This velocity will, however, still be insufficient to avoid turbulence in an actual bearing. This turbulence, we consider, may be most marked again at very low and very high speeds, and as already stated, may take the form of vortices spinning on axes which coincide with or are parallel to the radii of the shaft.

In any plain bearing there is always a very characteristic drop in the pressure in the oil film at the termination of the maximum loaded area. At the point we consider that the forces imposed upon the lubricant cause it to become more fluid than in the loaded area itself and it tends, therefore, to accelerate. This phenomena might be compared to the "Venturi" effect encountered in a nozzle although clearly the physical conformation of a bearing does not compare with a nozzle.

When one wide wall of the "tube," already referred to, is moving the presence of any irregularities, such as an oil groove of normal type, has a very great influence on the behaviour of the lubricant. This is particularly marked in cases where the groove is arranged spirally in the bore of a bearing. Such an arrangement greatly assists the setting up of turbulence and vortices. My invention avoids anything of this nature as the long boundaries of the oil pockets are always parallel to the centre line of the shaft. The oil pocket situated prior to the loaded area in a plain bearing permits oil to be supplied smoothly and minimises the risk of turbulence or vortices being set up. The oil pocket located after the loaded area tends to limit the "Venturi" effect and to prevent the drop of pressure in the volume of lubricant being such that negative pressure in relation to the atmosphere is attained. The forces act on the oil after the loaded area are controlled by the provision of this pocket and this results in conditions being more favourable for a steady flow, and the maintenance of a stable uniform film of lubricant in the bearing when in service. Furthermore, the smooth flow of lubricant encouraged by use of the pockets helps to keep down "frothing" or its elimination.

When a plain bearing is carrying a shaft rotating at a high peripheral speed turbulence in the lubricant results in the formation of heat and an increase in friction which also generates heat. This upper limit of speed for plain bearings can be raised by the application of the present invention. The risk of damage and seizure is reduced both at very low and at very high speeds, particularly where the lining of the bearing is comparatively hard, such as a copper-lead mixture or an aluminum base alloy.

It will be appreciated that bearing alloys of the correct physical properties should be used in conjunction with the present invention to obtain the most successful results, the antifriction alloys being related to the surface which is required from the bearing in order to secure maximum efficiency in service.

What I claim and desire to secure by Letters Patent is:

1. In a cylindrical bearing assembly, a stationary bearing surface provided with a generally rectangular pocket of thin crescent shaped cross section having straight closed vertical side walls and of width about two thirds of the width of said bearing surface and of length less than the width thereof and disposed generally centrally with respect to the edges of said bearing surface and means for supplying lubricating oil directly to said pocket.

2. In a cylindrical bearing assembly, a bearing surface provided with a generally rectangular pocket of thin crescent shaped cross section having straight closed vertical side walls and of width about two thirds of the width of said bearing surface and of length less than the width thereof and of depth about ten times the running clearance of said bearing assembly and disposed generally centrally with respect to the edges of said bearing surface and means for supplying lubricating oil directly to said pocket.

3. In a cylindrical bearing assembly, a bearing surface provided with a generally rectangular pocket of thin crescent shaped cross section having straight closed vertical side walls and of width about two thirds of the width of said bearing surface and of length less than the width thereof and disposed generally centrally with respect to the edges of said bearing surface and a groove in said bearing surface communicating with said pocket and adapted to supply lubricating oil directly thereto.

4. In a cylindrical bearing assembly, a bearing surface provided with a plurality of generally rectangular pockets of thin crescent shaped cross section having straight vertical side walls and of depth about ten times the running clearance of said bearing assembly, said pockets being symmetrically grouped and disposed in the vicinity of the area of maximum loading of said bearing surface and extending laterally in the aggregate over approximately the central two thirds of the width of said bearing surface and means for supplying lubricating oil directly to said pockets.

JOHN JAMES COPPEN.

REFERENCES CITED

The following references are of record in the file of this patent:

UNITED STATES PATENTS

| Number | Name | Date |
|---|---|---|
| 214,662 | Hostetter | Apr. 22, 1879 |
| 1,236,511 | Waring | Aug. 14, 1917 |
| 1,746,020 | Whiteley | Feb. 4, 1930 |
| 1,940,301 | Grobel et al. | Dec. 19, 1933 |
| 2,004,254 | Taub | June 11, 1935 |

FOREIGN PATENTS

| Number | Country | Date |
|---|---|---|
| 38,226 | France | Apr. 24, 1931 |
| | (2nd addition to No. 650,137) | |
| 295,405 | Great Britain | Jan. 31, 1929 |
| 380,660 | Great Britain | Sept. 22, 1932 |
| 541,306 | Germany | Jan. 11, 1932 |
| 568,724 | Great Britain | Apr. 18, 1945 |
| 738,343 | France | Dec. 23, 1932 |